(12) United States Patent
Rosenthal

(10) Patent No.: US 11,465,169 B1
(45) Date of Patent: Oct. 11, 2022

(54) APPARATUS FOR COATING OR MIXING ITEMS WITH CONTROLLED UNLOADING

(71) Applicant: ROYCE METAL PRODUCTS LIMITED, Toronto (CA)

(72) Inventor: Ronald Rosenthal, Toronto (CA)

(73) Assignee: ROYCE METAL PRODUCTS LIMITED, Toronto (CA)

( * ) Notice: Subject to any disclaimer, the term of this patent is extended or adjusted under 35 U.S.C. 154(b) by 0 days.

(21) Appl. No.: 17/700,815

(22) Filed: Mar. 22, 2022

Related U.S. Application Data

(60) Provisional application No. 63/165,431, filed on Mar. 24, 2021.

(51) Int. Cl.
*B05C 13/02* (2006.01)
*B05C 19/00* (2006.01)

(52) U.S. Cl.
CPC .......... *B05C 13/025* (2013.01); *B05C 19/008* (2013.01)

(58) Field of Classification Search
None
See application file for complete search history.

(56) References Cited

U.S. PATENT DOCUMENTS

| | | | |
|---|---|---|---|
| 2,807,230 A | 9/1957 | Brammar | |
| 3,827,182 A | 8/1974 | Van Helleputte | |
| 3,934,545 A | 1/1976 | Schady | |
| 3,937,176 A | 2/1976 | Nicholson et al. | |
| 3,952,757 A | 4/1976 | Huey | |
| 3,988,133 A | 10/1976 | Schady | |
| 4,649,855 A | 3/1987 | Preis | |
| 5,002,205 A | 3/1991 | Itoh et al. | |
| 5,132,142 A * | 7/1992 | Jones | B01J 2/16 118/308 |
| 5,284,678 A * | 2/1994 | Hirschfeld | B01J 2/006 427/212 |
| 6,228,172 B1 * | 5/2001 | Taylor | A23G 3/26 118/712 |
| 7,252,048 B2 | 8/2007 | Nohynek | |
| 7,926,444 B2 * | 4/2011 | Terada | H01L 21/6715 118/612 |
| 8,268,080 B2 * | 9/2012 | Sudo | C23C 14/505 118/716 |
| 8,813,677 B2 * | 8/2014 | Sudo | C23C 14/50 118/716 |
| 9,168,564 B1 * | 10/2015 | Hays | G03G 15/0907 |

(Continued)

FOREIGN PATENT DOCUMENTS

CA 2455192 A1 7/2005
CH 686858 A5 7/1996

(Continued)

*Primary Examiner* — Jethro M. Pence
(74) *Attorney, Agent, or Firm* — Perry + Currier Inc.

(57) ABSTRACT

An apparatus for coating or mixing of loose items is provided. The apparatus includes a rotatable bowl shaped to contain a quantity of loose items for coating or mixing as the bowl is rotated. The rotatable bowl includes a plurality of discharge openings. A drive shaft is configured to rotatably support the bowl. A closure ring is positioned to close the discharge openings. The closure ring is retractable while the rotatable bowl is rotating to allow coated or mixed items to fall through the openings to unload the coated items from the rotatable bowl after coating/mixing is complete.

8 Claims, 6 Drawing Sheets

(56) References Cited

U.S. PATENT DOCUMENTS

| | | | |
|---|---|---|---|
| 10,363,532 B2* | 7/2019 | Cornelius | A23G 1/0036 |
| 11,020,762 B2* | 6/2021 | Lutz | B05B 12/14 |
| 2011/0197810 A1* | 8/2011 | Fusejima | A23G 4/025 |
| | | | 118/313 |
| 2018/0311629 A1* | 11/2018 | Cornelius | A23G 3/26 |
| 2020/0055072 A1* | 2/2020 | Gandolfi | A23P 20/18 |
| 2020/0061568 A1* | 2/2020 | De Broqueville | B05C 19/00 |
| 2022/0032258 A1* | 2/2022 | Desai | C23C 16/4417 |

FOREIGN PATENT DOCUMENTS

| | | |
|---|---|---|
| DE | 2445103 A1 | 4/1976 |
| DE | 3302588 A1 | 12/1983 |
| DE | 3226110 A1 | 1/1984 |
| DE | 29802720 U1 | 7/1999 |
| EP | 0504773 A1 | 9/1992 |
| FR | 2251270 A1 | 6/1975 |
| JP | 5324881 B2 | 10/2013 |
| KR | 101207973 B1 | 12/2012 |
| WO | WO-2007065652 A1 | 6/2007 |

\* cited by examiner

APPARATUS FOR COATING OR MIXING ITEMS WITH CONTROLLED UNLOADING

CROSS-REFERENCE TO RELATED APPLICATIONS

This application claims the benefit of U.S. 63/165,431, filed Mar. 24, 2021, which is incorporated herein by reference.

FIELD

This invention relates to apparatus for coating or mixing loose items. More specifically, the invention relates to apparatus using a rotatable bowl for coating or mixing items.

BACKGROUND

Devices for mixing and coating loose items such as confectionary items, pills, tablets and the like are well known in the art. These devices are generally composed of a bowl that is rotatable and in which the items to be coated are introduced together with a coating material, such as a liquid, powder, paste, or the like. As the bowl rotates, the contents of the bowl are mixed and coated by the movement of the bowl. One of the challenges with such processes is the unloading of coated items from the bowl after coating is complete. The unloading of the items is often performed manually using a shovel. However, this method is cumbersome and inefficient.

To address this problem, several devices have been designed to unload the coated items. For example, EP 0504773 (entitled "DEVICE FOR COATING TABLETS OR MICROGRANULES") discloses use of curved blades which extend between openings of a drum for controlled dispersal of items. In this case, the unloading is dependent on drum's direction of rotation. In another example, DE 3226110 (entitled "DRAGING BOILER EMPTYING") discloses an opening flap and an emptying nozzle. The opening flap when aligned with emptying nozzle allows for controlled dispersal. U.S. Pat. No. 2,807,230 (entitled "APPARATUS FOR COATING PILLS AND TABLETS") discloses removable conduit with a scoop affixed to interior of coating pan for dispersal. U.S. Pat. No. 7,252,048 (entitled "COATING DEVICE WITH INTEGRATED CLEANING DEVICE") discloses a screening element on exterior of drum that can be moved back and forth along a rail guide to allow for dispersion of the items therein.

SUMMARY

According to an aspect of the disclosure, an apparatus for coating or mixing items is provided. The apparatus comprises a rotatable bowl shaped to contain a quantity of loose items for coating or mixing as the bowl is rotated. The rotatable bowl includes a plurality of discharge openings. A drive shaft is configured to rotatably support the bowl. A closure ring is positioned to close the discharge openings. The closure ring is retractable while the rotatable bowl is rotating to allow coated or mixed items to fall through the openings to unload the coated items from the rotatable bowl after coating/mixing is complete.

BRIEF DESCRIPTIONS OF THE DRAWINGS

Embodiments are described with reference to the following figures.

DETAILED DESCRIPTION OF THE EMBODIMENTS

Conventional mixing and coating devices often require manual intervention for unloading which is inefficient. It may also impact the accuracy of the overall process and is difficult to control. Attaining controlled and efficient unloading in the past required complex mechanisms. The present invention addresses these problems by providing an apparatus comprising a rotatable bowl shaped to contain a quantity of loose items for coating or mixing (i.e., coating, mixing, or both coating and mixing) as the bowl is rotated. The rotatable bowl comprises a plurality of discharge openings; a drive shaft configured to rotatably support the bowl; and a closure ring positioned to close the discharge openings. The closure ring is retractable while the rotatable bowl is rotating to allow coated or mixed items to fall through the openings to unload the items from the rotatable bowl after coating or mixing is complete. This retractable functionality of the closure ring allows for easy and controlled unloading of items as compared to known manual methods of unloading or the complex unloading mechanisms known in the past. The present invention thus provides an efficient unloading mechanism which does not require manual shoveling, provides an easy way to control discharge rate, for example, by controlling bowl speed or retraction of the closure ring or both, and provides better accuracy of unloading.

Figure 1:
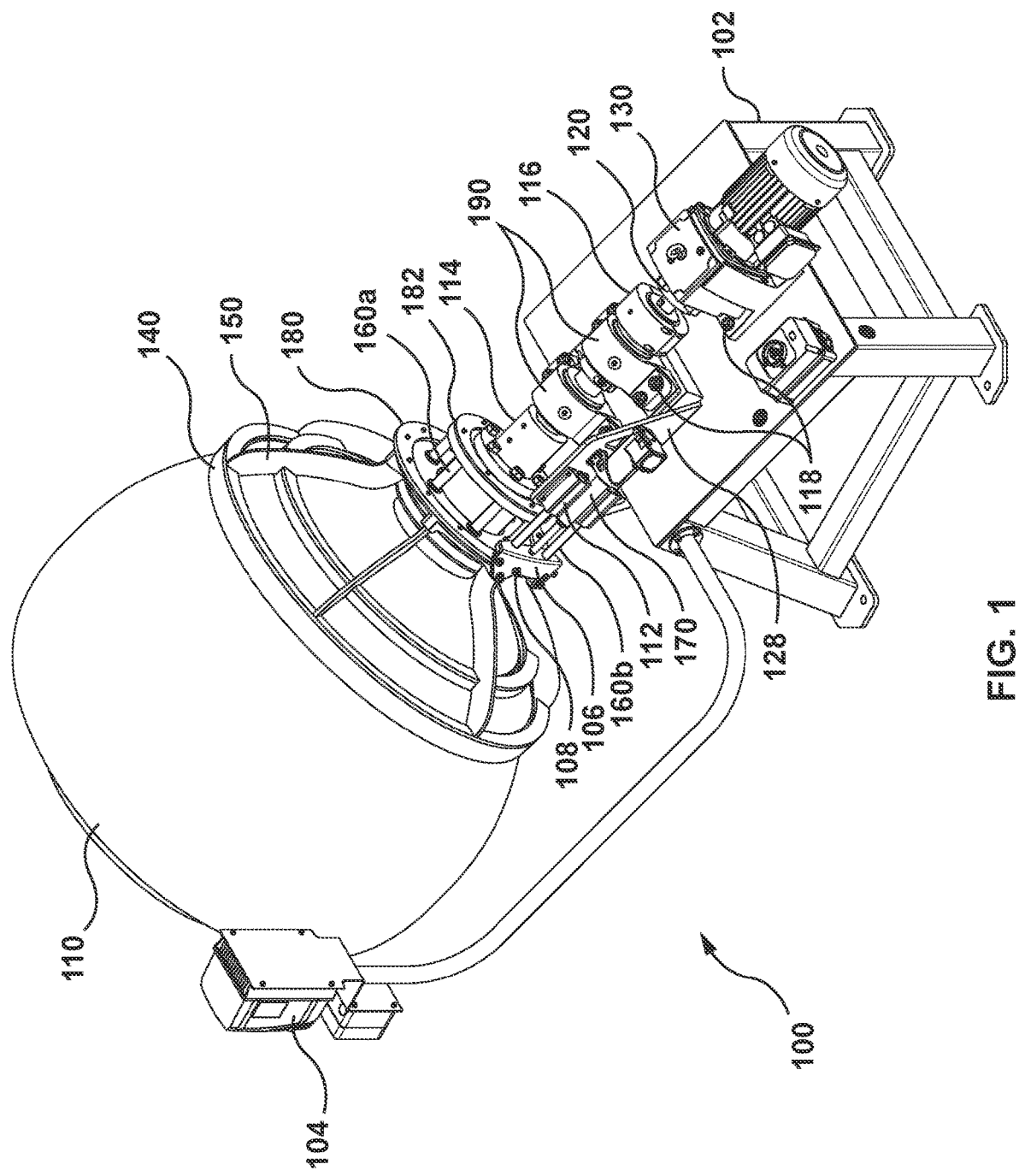
FIG. 1 is a rear perspective view of an apparatus for coating or mixing loose items.

FIG. 1 shows a rear perspective view of an apparatus 100 for coating or mixing loose items. The apparatus 100 comprises a rotatable bowl 110 to coat or mix items by rotation of the bowl. The rotatable bowl 110 is tilted with respect to the horizontal. In the figures, the rotatable bowl 110 is substantially spherical. Alternatively, the bowl can be cylindrical or ellipsoid.

The items to be coated or mixed may be confectionary items, pills, tablets, or any such loose item. A liquid, powder, or other material may be introduced to the bowl 110 to coat the items.

The rotatable bowl 110 is supported by a drive shaft 120. The drive shaft 120 is connected to a motor 130 to drive rotation of the rotatable bowl 110 to allow uninterrupted coating or mixing of items within the rotatable bowl 110. The drive shaft 120 is attached to a platform 102 through a plurality of bearings 190. The platform 102 is inclined to cause the rotatable bowl 110 to be tilted.

The drive shaft 120 passes through the plurality of bearings 190 which support the drive shaft 120 on the platform 102 and allow it to rotate. The drive shaft 120, motor 130 and bearings 190 are attached to the platform 102 through a plurality of screws 118.

The drive shaft 120 is further connected to a first support member 116 and a second support member 114. Both first support member 116 and second support member 114 are positioned away from the platform 102. The drive shaft 120 passes through first support member 116 and second support member 114 which rotate with the drive shaft 120.

The rotatable bowl 110 is releasably connected to a closure ring 140. The closure ring 140 closes a plurality of discharge openings (labelled as 124 in FIGS. 2A, 2B & 2C) present on the rotatable bowl 110. The closure ring 140 is connected to a plurality of legs 150 positioned below the closure ring 140 to support the closure ring 140. The plurality of legs 150 are connected to the drive shaft 120 through an actuation disc 180, a ring piece 182, and a plurality of guide rods 160a sandwiched between the actuation disc 180 and the ring piece 182. During mixing or coating of loose items, the closure ring 140 rotates with the rotatable bowl 110 along with the actuation disc 180, the ring piece 182, and the plurality of guide rods 160a.

The closure ring 140 is further connected to an actuator 170 that is affixed to a plate 128 which is connected to the platform 102 which allows the closure ring 140 to retract after mixing or coating of loose items is complete. The actuator 170 is connected to the actuation disc 180 through an actuation arm 106 and a plurality of guide rods 160b. The plurality of guide rods 160b pass through a plurality of bushings 112 affixed to the plate 128 to hold the plurality of guide rods 160b.

The actuation arm 106 clamps the actuation disc 180 through a plurality of knobs 108. The plurality of knobs 108 push and pull the actuation disc 180 and closure ring 140 back and forth, while still allowing the actuation disc 180 and closure ring 140 to rotate.

As the closure ring 140 retracts, guide rods 160a guide backward movement of actuation disc 180 and guide rods 160b guide the backward movement of actuation arm 106.

The apparatus 100 further comprises a controller 104 configured to control coating or mixing process parameters such as a rate of rotation of the motor 130 and thus the speed of the rotatable bowl 110 and rate/degree of movement of the closure ring 140. The controller 104 comprises an input device for a user to input a set of instructions comprising for e.g., rate of rotation of the rotatable bowl 110 and rate/degree of movement of the closure ring 140. The controller 104 further comprises a processor configured to process the set of instructions and a display configured to display apparatus 100 settings.

Figure 2A:
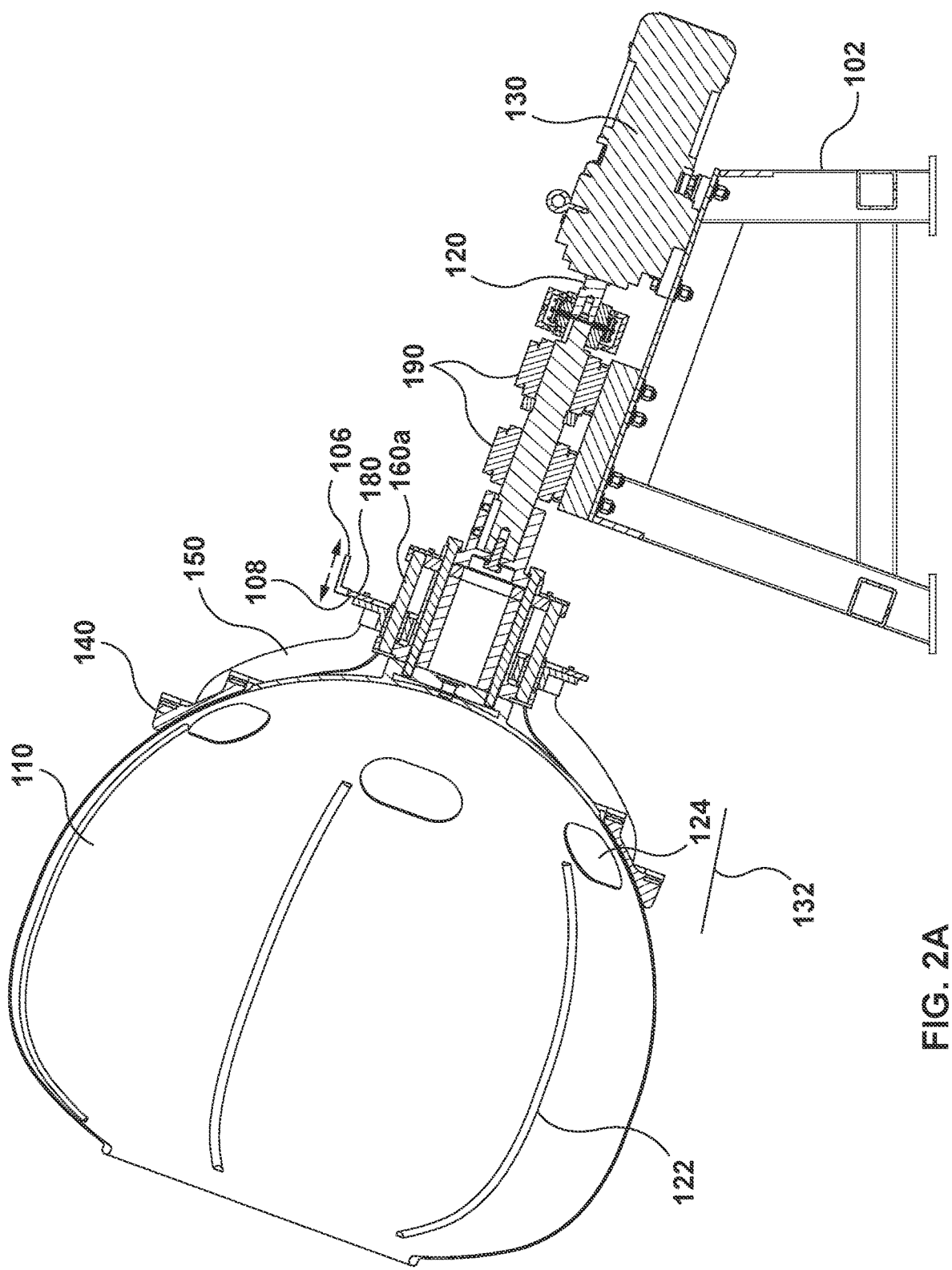
FIG. 2A is a side cross-section view of the apparatus of FIG. 1 in a closed position.
Figure 2B:
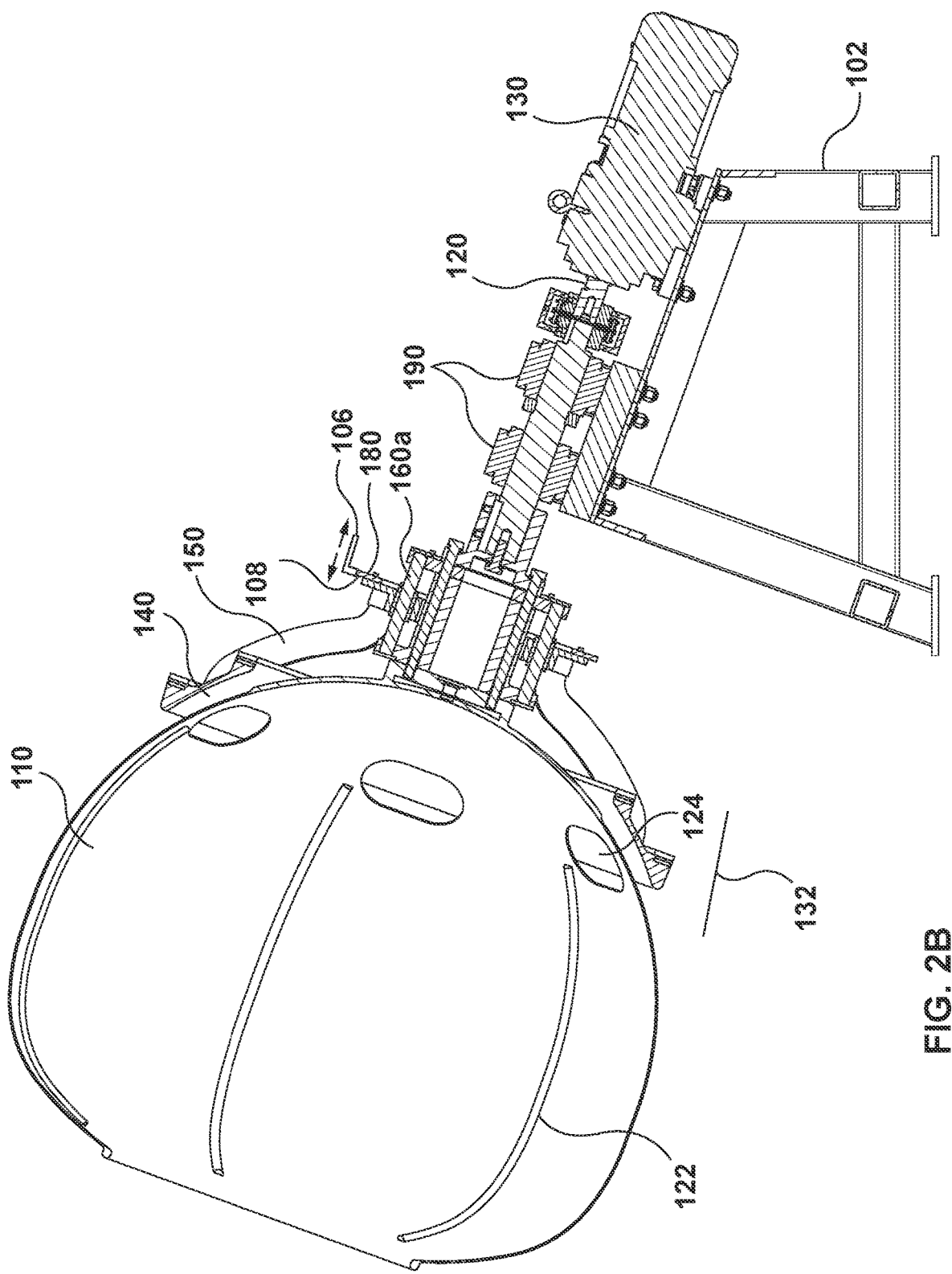
FIG. 2B is a side cross-section view of the apparatus of FIG. 1 in an intermediate position.
Figure 2C:
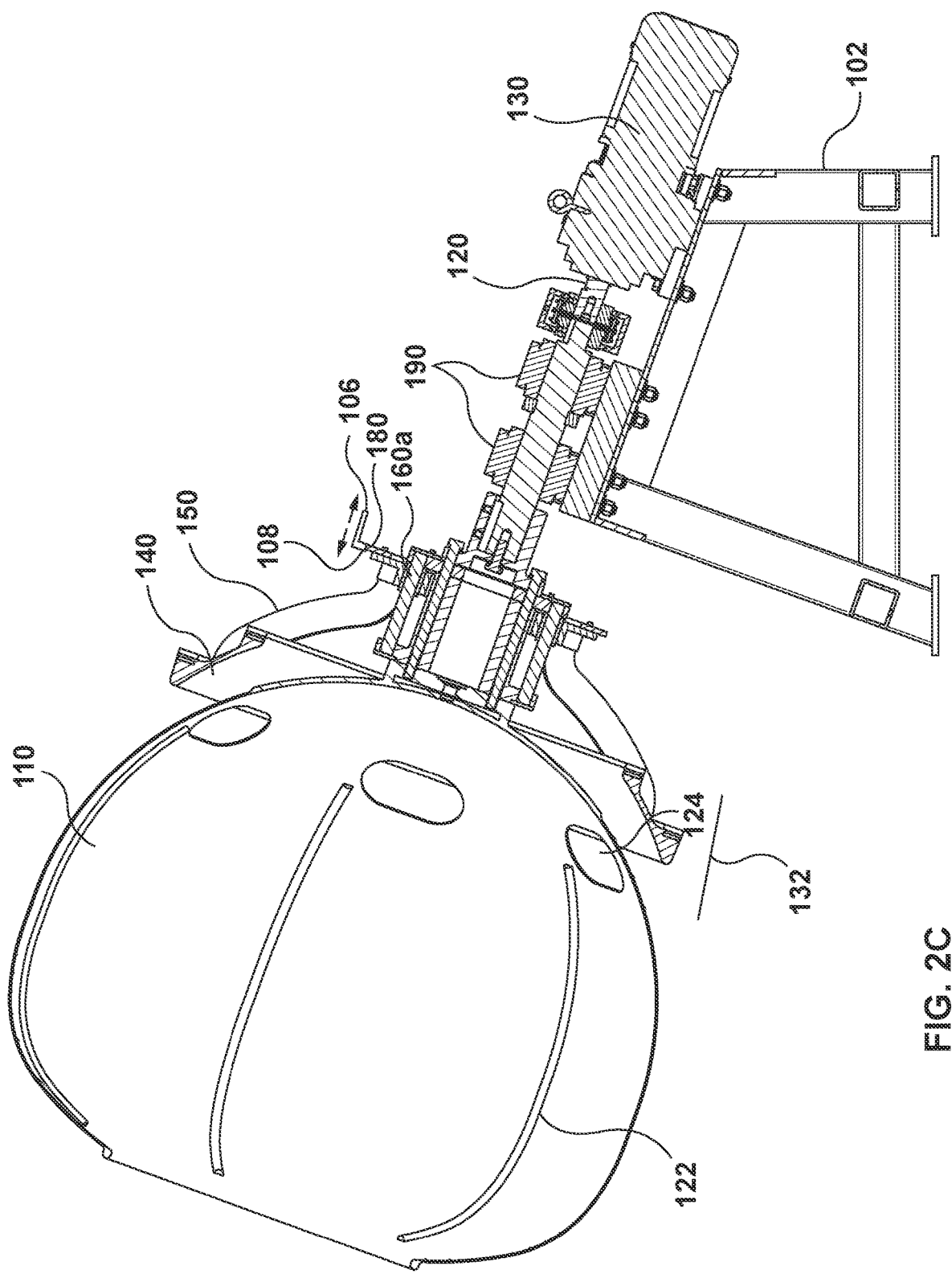
FIG. 2C is a side cross-section view of the apparatus of FIG. 1 in an open position.

The controller 104 is connected to the platform 102 through a connector. The motor 130 and actuator 170 operate in communication with the controller 104. Thus, during mixing or coating, the controller 104 controls the rate of mixing or coating of items. The controller 104 is connected to the actuator 170 to control a rate of movement of the closure ring 140 once the coated or mixed items are ready to be discharged. The actuator 170 controls the overall rate of unloading the items. The retraction of the closure ring 140 exposes the plurality of discharge openings 124 present on the rotatable bowl 110 as shown in FIGS. 2A, 2B & 2C depicting apparatus 100 in closed, intermediate, and open configurations, respectively.

The controller 104 may include a processor, a memory connected to the processor, an input/output (I/O) interface connected to the processor, and a power supply to power the processor, memory, and I/O interface. The processor may include a central processing unit (CPU), microprocessor, field programmable gate array (FPGA), or application-specific integrated circuit (ASIC) configurable by hardware, firmware, and/or software. The memory may include volatile memory, non-volatile memory, or both. The memory is a non-transitory machine-readable medium that may include an electronic, magnetic, optical, or other type of physical storage device that encodes instructions that implement the functionality for the apparatus 100 as discussed herein. Examples of such storage devices include a non-transitory computer-readable medium such as a hard drive (HD), solid-state drive (SSD), read-only memory (ROM), electrically-erasable programmable read-only memory (EEPROM), or flash memory. The memory may be integrated with the processor. The processor and memory may together be integral to an FPGA. Instructions may be directly executed, such as binary or machine code, and/or may include interpretable code, bytecode, source code, or similar instructions that may undergo additional processing to be executed. All of such examples may be considered executable instructions. The I/O interface connects the processor to the apparatus 100. The I/O interface may include a general purpose I/O (GPIO) circuit that provides signal communication between the processor and the apparatus 100.

The discharge openings 124 are distributed evenly around a circumference of the rotatable bowl 110 to allow coated or mixed items to move toward these openings to promote efficient unloading.

The rotatable bowl 110 further comprises a plurality of ribs 122 positioned at interior of the rotatable bowl 110 and distributed circumferentially to guide the coated or mixed items towards the discharge openings 124 as the rotatable bowl 110 is rotated.

During unloading, the rotatable bowl 110 continues to rotate, the closure ring 140 retracts and the discharge openings 124 are no longer sealed by the closure ring 140, allowing coated or mixed items to discharge. At this point, the actuation disc 180 is retracted by the plurality of knobs 108 and it slides through the plurality of guide rods 160a and at the same time, the actuation arm 106 slides through the plurality of guide rods 160b together allowing items to be discharged.

The apparatus 100 may further comprise a secondary plate 132 aligned below the closure ring to guide the discharged items out of the rotatable bowl 110 when the closure ring 140 retracts. The secondary plate 132 may be affixed to the platform 102.

Figure 3:
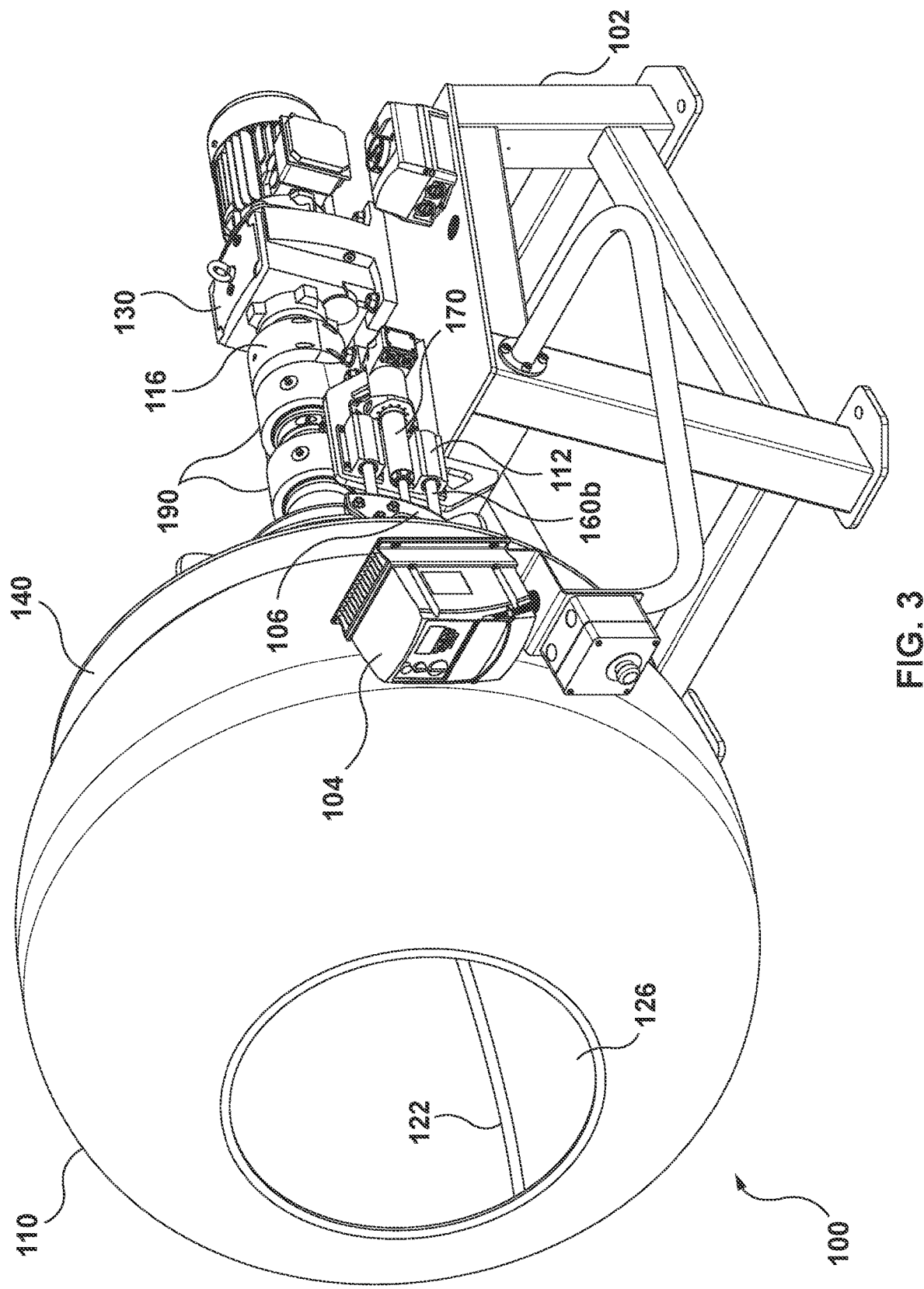
FIG. 3 is a front perspective view of the apparatus of FIG. 1.

The loose items to be coated or mixed are fed to the rotatable bowl 110 through an inlet opening 126 as shown in FIG. 3. The inlet opening 126 may be covered by a covering (not shown) to protect the items fed inside the rotatable bowl. Alternatively, the inlet opening may be left open.

Figure 4:
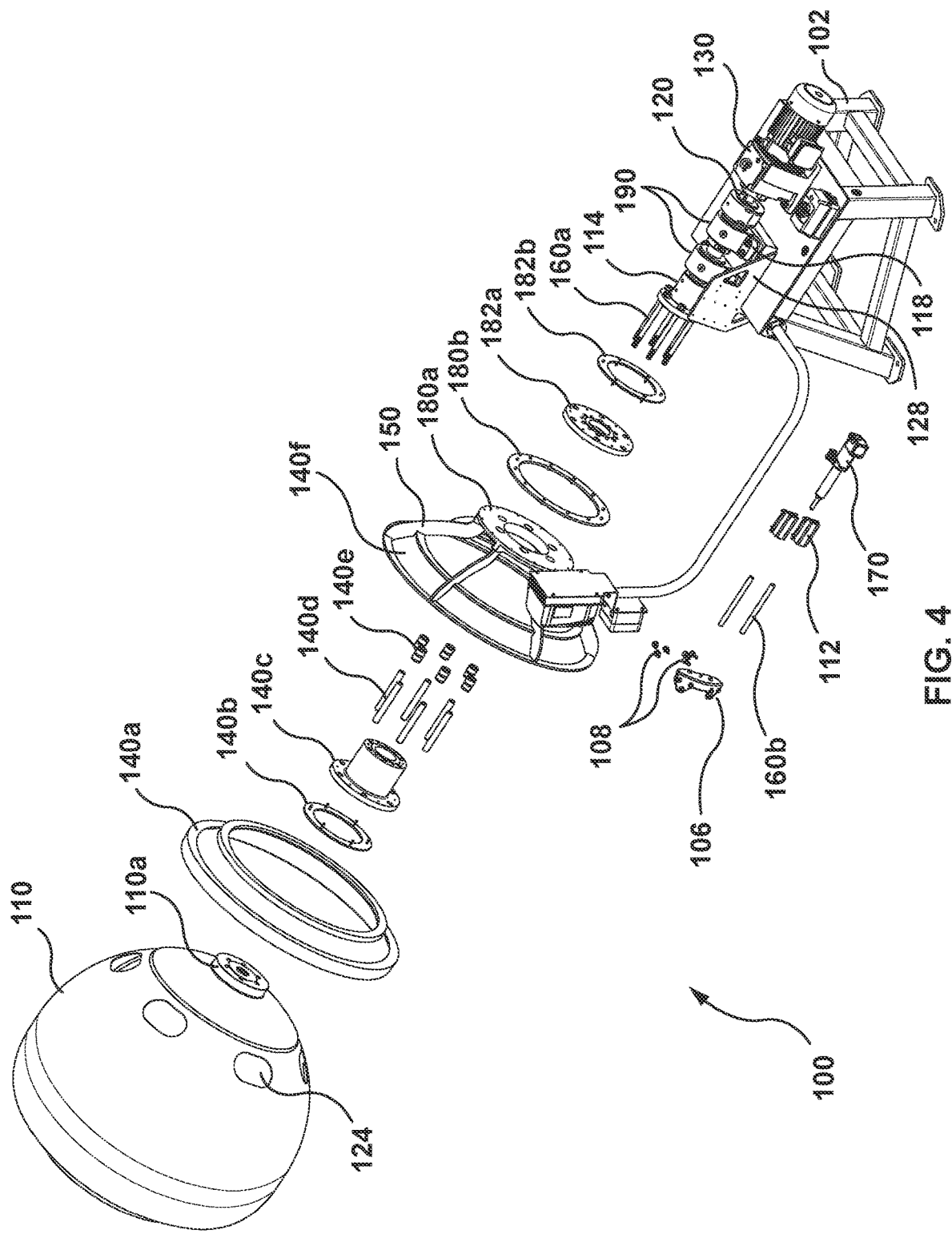
FIG. 4 is an exploded view of the apparatus of FIG. 1.

FIG. 4, which is an exploded view of the apparatus 100, shows all components of the present invention discussed above. A first ring member 140a covers the discharge openings 124 during mixing or coating of items. The rotatable bowl 110 comprises an engaging member 110a to connect the rotatable bowl 110 with closure ring assembly components 140a-140f.

The engaging member 110a fits between a first fastening ring 140b which comprises connectors configured to engage with plurality of holes present in a cap member 140c. Cap member 140c is further connected to a second ring member 140f through a plurality of nuts and bolts (140d, 140e).

The closure ring support legs 150 are positioned below the ring cover member 140f and are connected to a disc member 180a comprising plurality of holes. The disc member 180a fits between a second fastening ring 180b which is connected with the actuation arm 106 through the plurality of screws 108.

The disc member 180a is further connected to third and fourth fastening rings (182a and 182b). The guide rods 160a fit inside the plurality of holes present on the disc member 180a. The guide rods 160a function to rotate the disc member 180a along with the first ring member 140a and the second ring member 140f along with the rotatable bowl 110.

As should be apparent from the above, an automatic and controllable apparatus for coating or mixing items is provided with the capability to discharge items at a controlled rate without the need for manual intervention. This may allow for increased efficiency and further for better matching of item discharge rate to the rates of downstream processes.

The scope of the claims should not be limited by the embodiments set forth in the above examples but should be given the broadest interpretation consistent with the description as a whole.

The invention claimed is:

1. An apparatus for coating or mixing loose items comprising:
    a rotatable bowl shaped to contain a quantity of the loose items for the coating or mixing as the rotatable bowl is rotated, the rotatable bowl comprising a plurality of discharge openings;
    a drive shaft configured to rotatably support the rotatable bowl; and
    a closure ring positioned to close the plurality of discharge openings, wherein the closure ring is retractable while the rotatable bowl is rotating to allow coated or mixed items to fall through the plurality of discharge openings to unload the coated or mixed items from the rotatable bowl after the coating or mixing is complete.

2. The apparatus as claimed in claim 1, wherein the closure ring comprises a plurality of legs positioned below the closure ring and connected to the drive shaft to allow the closure ring to rotate with the rotatable bowl.

3. The apparatus as claimed in claim 1, wherein the plurality of discharge openings are distributed evenly around a circumference of the rotatable bowl.

4. The apparatus as claimed in claim 1, wherein the rotatable bowl comprises a plurality of ribs positioned at an interior of rotatable bowl and distributed circumferentially to guide the coated or mixed items towards the plurality of discharge openings as the rotatable bowl is rotated.

5. The apparatus as claimed in claim 1, further comprising:
    a motor connected to the drive shaft to drive rotation of the rotatable bowl; and
    a controller configured to control a rate of rotation of the motor to control a rate of unloading of the coated or mixed items through the plurality of discharge openings.

6. The apparatus as claimed in claim 5, further comprising an actuator connected to the drive shaft and configured to retract the closure ring.

7. The apparatus as claimed in claim 6, wherein the actuator is connected to the controller to control a rate of movement of the closure ring.

8. The apparatus as claimed in claim 1, further comprising a secondary plate aligned below the closure ring to guide the coated or mixed items out of the rotatable bowl.

* * * * *